L. CONROY.
STREET SWEEPING MACHINE.
No 32,051. Patented Apr. 16, 1861.
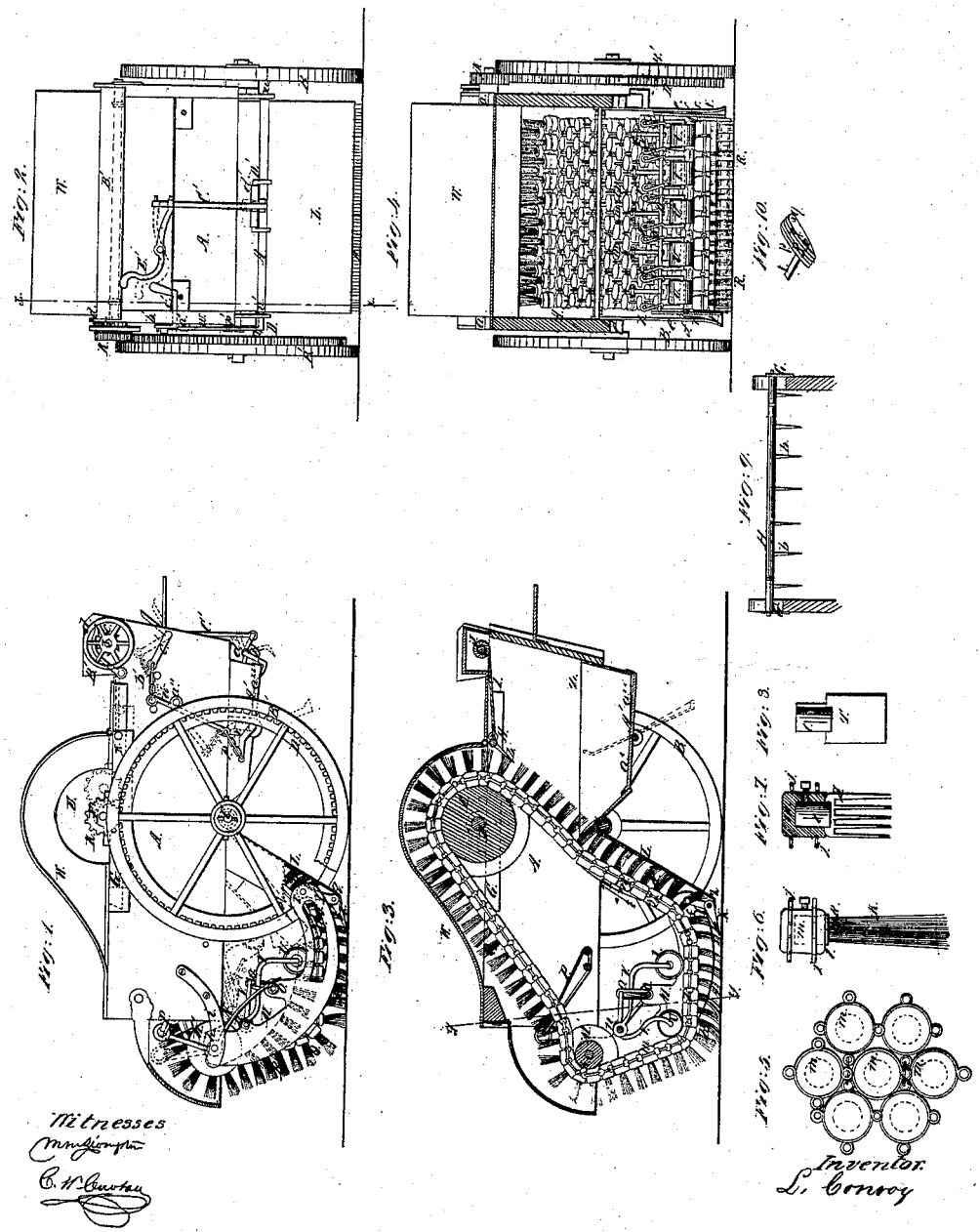

UNITED STATES PATENT OFFICE.

LOUGHLIN CONROY, OF NEW YORK, N. Y.

STREET-SWEEPING MACHINE.

Specification of Letters Patent No. 32,051, dated April 16, 1861.

*To all whom it may concern:*

Be it known that I, LOUGHLIN CONROY, of 265 West Thirty-fifth street, in the city, county, and State of New York, have invented a new and Improved Street-Sweeping Machine; and I do hereby declare that the following is a full, clear, and exact description of the same, reference being had to the annexed drawings, making a part of this specification, in which—

Figure 1, is a side view of my invention; Fig. 2, an end view of the same; Fig. 3, a side sectional view of the same, taken in the line $x$, $x$, Fig. 2; Fig. 4, a front sectional view of the same, taken in the line $y, y$, Fig. 3. Fig. 5, is an enlarged top view of a portion of the endless sweeping apron; Figs. 6, 7, and 8, detached views of sweepers; Fig. 9, a detached front view of the apron clearers or cleaners; Fig. 10, a detached perspective view of a portion of a yielding comb.

Similar letters of reference indicate corresponding parts in the several figures.

This invention consists in the employment or use of an endless sweeping apron formed of brushes, scrapers, or rakes, connected together substantially as hereinafter shown and applied to a mounted box or wagon in such a way as to admit of being adjusted above the surface of the street and remain stationary when not required for use and also to admit of being so adjusted as to be brought in contact with the surface of the street and operated or moved so as to sweep up the dirt therefrom, and conform to the inequalities of the surface of the street in order to perform perfect work.

The invention further consists in the employment or use of pressure rollers arranged and applied to the sweeping apron to insure a proper action of the latter on the surface of the street.

To enable those skilled in the art to fully understand and construct my invention, I will proceed to describe it.

A, represents a box which is mounted on wheels B, B', the latter being placed loosely on their axle C, and the wheel B', provided with a concentric toothed ring D, as shown in Figs. 1, 2, and 4. On the upper part of the box A, there is placed transversely a cylinder E, the journals of the shaft F, of which, are placed in bearings $a$, $a$, attached to slides G, G, which are fitted on the sides of the box A. The front parts of the slides G, G, are connected by a bar H, which has teeth $b$, attached to it at right angles as seen in Fig. 9. The use of these teeth will be presently shown. The bar H, is connected by straps, cords or chains I, I, to a shaft J, which is at the front part of the box A, and has a ratchet $c$, at one end into which a pawl $d$, catches, see Figs. 1, and 2. On one end of shaft F, of cylinder E, there is placed a pinion K, which gears into the toothed ring D, when the machine is in operation.

L, is an inclined plane the upper part of which is fitted loosely on the axle C, and is provided with sides $e$, $e$, to each of which at its lower end a sector plate M, is attached by means of a hook $f$, which is fitted within a curved slot $g$, see Fig. 1. The upper ends of the sector plates M, M, are hung on the shaft $h$, of a roller M', said shaft $h$, having its bearings in arms $i$, $i$, which are attached to the sides of the box. On the shaft $h$, near each end of it there is placed an arm N. The lower parts of these arms bear upon a shaft O, which connects the two plates M, M, and to the upper ends of said arms, springs P, are attached, said springs having a tendency to keep the sector plates M, depressed to their fullest extent. In an operating machine the weight or gravity of the plates M, will probably be sufficient to keep them depressed without the aid of springs.

Q, represents an endless sweeping apron which is composed of a series of brushes R, connected together by links $j$, as shown in Fig. 5, or by any other universal connection which will admit of the apron having a requisite degree of flexibility. The brushes, see Fig. 6, may be each formed of wires, bristles, or other suitable material $k$, fitted in a head $l$, which is secured in a socket $m$. The sockets $m$, are connected together by the links $j$. In certain cases a number of rakes S, may be employed, as shown in Fig. 7, said rakes being connected with the brushes, and scrapers T, Fig. 8. Simple flat plates, may also be employed. The endless apron Q, thus constructed is placed around the cylinder E, and roller M', as shown clearly in Fig. 3, and the apron has bearing upon its inner side a series of pressure rollers U. These rollers are attached to arms V, which are fitted on a shaft $n$, attached to the plates M, M, and have india-rubber or other suitable springs $o$, connected to them, said spring being attached to the shaft O. The rollers U, extend the whole width of the apron as shown in Fig. 4, and the rollers are arranged in two rows, one row being behind the other as shown in Fig. 3. This arrangement of the rollers admits of a requisite surface of the apron Q, bearing on the surface of the street as will be fully understood by referring to Fig. 3. The upper part of the apron Q, is covered by a hood W.

X, represents a comb which is at the lower part of the inclined plane L. This comb is formed of a series of teeth $p$, the back parts of which are fitted loosely on a rod $q$, the ends of which are attached to levers Y, Y, said levers being connected by pivots $r$, $r$, to the sector plates M, M. Each lever Y, has a spring $s$, attached to it, and these springs bear upon the inclined plane L, and have a tendency to keep the outer ends of the teeth $p$, in contact with the surface of the street, and each tooth $p$, is allowed to yield or give independently of the other by means of an elastic strap $t$, which passes transversely through them as shown in Fig. 10.

The apron Q, works directly over the comb X, as shown clearly in Figs. 1, and 3, and the apron and comb at their junction are kept in contact with the surface of the street.

As the machine is drawn along the cylinder E, is rotated from the wheel B', by means of the gearing D, K, and the apron Q, is moved in the direction indicated by the arrow 1, and the dirt is swept up the inclined plane L, by the apron Q, and is deposited in a receptacle Z, at the front part of the box A, see Fig. 3. The yielding comb X, is an important feature of the invention, as it conforms to the inequalities of the surface of the street and enables the apron Q, to work efficiently, as any material space allowed between the outer end of the comb X, and the surface of the street would admit of some dirt escaping under the comb.

When the machine is being drawn from place to place the apron Q, is drawn above the surface of the street by turning the shaft J, and thereby winding up the cords or chains I, I, and drawing back the slides G, G, and cylinder E, and the sector plates M, M, pressure rollers U, and inclined plane L, will consequently be raised as shown in red in Fig. 1, the inner or back ends of the plates M, M, being allowed to slide backward in consequence of their connection to the sides $e$, $e$, of the inclined plane L, by means of the hooks $f$, fitting in the curved slots $g$. The apron is retained in an elevated position in consequence of the ratchet $c$, and pawl $d$. As the slides G, G, are drawn back the pinion K, is drawn out from the toothed ring D, and the apron Q, stopped. The teeth $b$, of shaft H, cleanse the brushes R, of the apron, the dirt removed therefrom falling into receptacle Z.

The apron Q, is allowed to fall and come in contact with the surface of the street by releasing the pawl $d$, from the ratchet $c$, the gravity of the apron, and its concomitant parts, with or without the springs P.

The bottom A', of the receptacle Z, is hung on pivots $u$, $u'$, one at each end, said bottom being nearly balanced thereon, the back part $a^x$, being of less area than the front part $a^{xx}$, but slightly preponderating. One of the pivots ($u'$,) has a curved arm $v$, attached to it, and the other end of this arm is connected by a chain $p'$, to the lower end of a lever $w$, which is attached by a fulcrum pin $a''$, to one side of the box A. The upper end of the lever $w$, is connected by a chain $b'$, with a bent lever $c'$, which is placed within reach of the driver when on his seat B'.

To the front end of the box A, there is attached a slide C', the lower end of which has a fork D', secured to it. This fork D', is fitted in a socket or bearing $d'$, which is attached to the back of the receptacle Z. To the upper end of the slide C', there is connected a lever E', said lever being attached to the back of the box A. When the receptacle Z, is to be emptied the driver depresses the outer end of lever E', and thereby raises the slide C', and throws outward the fork D', free from the bottom A', and the lever $c'$, is then actuated and the bottom A', tilted so that the contents of the receptacle Z, will be discharged. By again actuating lever $c'$, the bottom A', closes and the fork D', is adjusted by actuating lever E', so as to hold up bottom A'.

Having thus described my invention, what I claim as new and desire to secure by Letters Patent; is,

1. The endless sweeping apron Q, when formed of brushes R, rakes S, scrapers T, any one of said parts being used, or all of them combined, and connected together by links $j$, or an equivalent universal joint attachment for the purpose of rendering the apron flexible so that it may conform to the inequalities of the surface of the street as set forth.

2. In combination with the sweeping apron Q, the pressure rollers U, applied and arranged to operate as and for the purpose set forth.

3. The arrangement substantially as shown of the sector plates M, M, inclined plane L', and slides G, G, on which the cylinder E, is placed, whereby the apron may be raised and lowered as set forth.

L. CONROY.

Witnesses:
 M. M. LIVINGSTON,
 C. W. COWTAN.